United States Patent [19]

Kresge et al.

[11] 3,967,160

[45] June 29, 1976

[54] ELECTRICAL OVERVOLTAGE SURGE ARRESTER WITH A LONG TIME CONSTANT VALVE SECTION AND SERIES GAP SECTION

[75] Inventors: James S. Kresge, Pittsfield; Harvey E. Fiegel, Richmond, both of Mass.

[73] Assignee: General Electric Company

[22] Filed: May 1, 1975

[21] Appl. No.: 573,566

[52] U.S. Cl. .................................... 317/68; 315/36; 317/70

[51] Int. Cl.$^2$ .......................................... H02H 9/06

[58] Field of Search .................. 317/67, 68, 70, 69; 315/36

[56] References Cited

UNITED STATES PATENTS 3,320,482 5/1967 Sakshaug et al. .................... 317/68

3,859,568 1/1975 Sakshaug ............................ 317/68

3,859,569 1/1975 Kresge ................................ 317/68

*Primary Examiner*—Harry Moose

*Attorney, Agent, or Firm*—Volker R. Ulbrich

[57] ABSTRACT

The arrester includes a valve section made up of high current-voltage characteristic exponent metal oxide varistor valve blocks having a relatively high capacitance and a series gap section made up of simple gap units, the gap section carrying less than about one fifth of the total arrester voltage during a discharge. The valve blocks of the valve section are each provided with a parallel-connected bleeder resistor to adjust the time constant of the valve section so that the faces of the valve blocks are returned to a common potential within a time interval of between about one and about two milliseconds for allowing sufficient deionization of arc gases without degrading multiple lightning surge performance.

9 Claims, 6 Drawing Figures

ELECTRICAL OVERVOLTAGE SURGE ARRESTER WITH A LONG TIME CONSTANT VALVE SECTION AND SERIES GAP SECTION

BACKGROUND OF THE INVENTION

The present invention relates generally to overvoltage surge arresters and particularly, but not exclusively, to such arresters for high voltage direct current applications.

Arresters protect the insulation of electrical power systems by momentarily reducing the impedance to ground of that portion of the system carrying an overvoltage surge, so that the undesired variation in available energy from the system due to the surge is safely drained off. Thus, a high voltage arrester may be regarded as a high speed, voltage sensitive, high current switch. The switching function in conventional arresters has been performed by a series combination of valve units and electrode gap units. The valve units are disc-shaped blocks of non-linear resistance, or varistor material which exhibits a decreasing resistance with increasing voltage. The gap units include a pair of horn-shaped gaps inside a special sparking chamber designed to aid in extinguishing an arc between the electrodes. There may be other components provided for the gap unit to control the establishing and extinguishing of the arc. For higher voltage arresters a plurality of valve units and gap units are interspersed in a series stack inside an insulating housing, usually a porcelain tube with metal end caps.

When such a conventional arrester is subjected to an overvoltage, one or more gaps spark over. This completes the circuit through the valves to ground. Current passes through the arrester to ground until the normal system voltage is once again established. At normal system voltage, the increased resistance of the valve section decreases the arrester current to a value insufficient to sustain arcing in the gap units. Thus the arcs are extinguished, and the arrester is once again an open switch.

The valve block resistance is determined by the relationship $I=KV^n$, where I represents the current, K represents a constant, V represents the voltage across the block, and n represents a numerical value which for conventional silicon carbide blocks is about 4 and which is referred to by those in the art of surge arresters as the "exponent" to describe the degree of non-linearity of a particular valve block varistor material. There are "low exponent" materials with an exponent of less than about ten and "high exponent" materials with an exponent greater than about ten.

It is recognized that the use of high exponent material such as a zinc oxide varistor compound for the valve blocks will result in a very substantial reduction in the magnitude of the follow current, without raising the arrester voltage above the desired limits during a discharge. The follow current can be reduced sufficiently that no additional current limiting function is required prior to simple clearing of the current by a simple series gap section, a section of simple gap units which are not provided with coils or other such features for limiting the follow current to a magnitude which will permit clearing. An arrester with a high exponent valve section and a simple series gap section can have the advantages of reduced cost, reduced size, and improved performance for both long voltage surges, such as switching surges, and isolated short surges, such as lightning surges. It is found, however, that when such an arrester is subjected to two or more lightning surges in quick succession, such as would result from a multiple lightning stroke, the performance of the arrester is severely degraded after the clearing of the first surge. The degraded performance is characterized by an altered sparkover voltage level for the arrester which permits the arrester voltage to exceed the desired sparkover voltage before the discharging process is initiated. Consequently, the arrester will fail to protect the system against such multiple surges.

SUMMARY OF THE INVENTION

In accordance with the present invention, an arrester is provided with a valve section having an effective capacitance-resistance time constant of from several hundred microseconds to about 10 milliseconds. A valve section with a time constant within this range has the effect of delaying the voltage recovery of the gap section after its clearing of a current for a time period sufficiently long to permit deionization of the arc gases, but sufficiently short to allow for full voltage recovery prior to the next impulse of a multiple lightning surge.

DESCRIPTION OF THE PREFERRED EMBODIMENT

Figure 1:
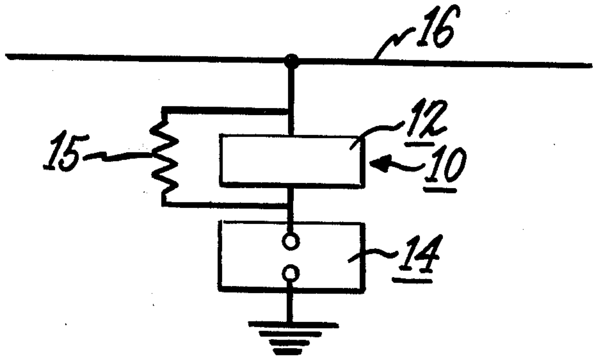
FIG. 1 is a simplified schematic block diagram showing a valve section and a gap section of an arrester in accordance with a preferred embodiment of the present invention.

A preferred embodiment of the present invention is the arrester 10 shown in general block diagram schematic in FIG. 1. The arrester 10 includes a valve section 12 and a gap section 14 inside an insulating housing, not shown, and connected in series between a power line 16 and ground. Connected in parallel with the valve section is a bleeder resistor 15. The valve and gap sections 12, 14 each include a plurality of valve units and gap units, respectively, and these are stacked in interspersed series relationship to permit more uniform grading of the voltage along the length of the arrester. Such interspersed stacking can be made conveniently by manufacturing identical individual arrester modules, and stacking these modules in sufficient numbers to provide the desired voltage rating.

In the arrester 10 of the preferred embodiment individual arrester modules are paired side by side but connected in series to form a module assembly unit. Such units are then stacked inside the housing in sufficient numbers to attain the desired voltage rating.

Figure 2:
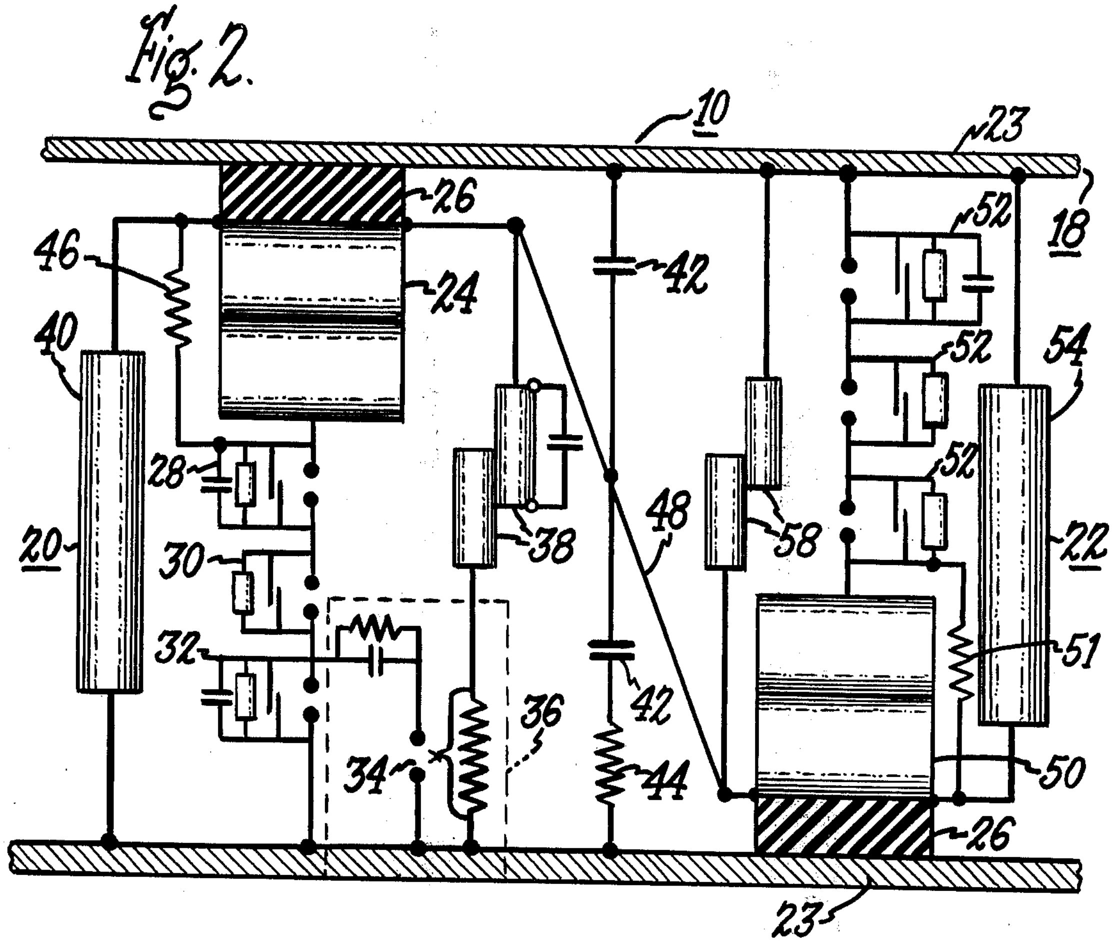
FIG. 2 is a partly schematic circuit diagram of an arrester module assembly unit of the arrester of FIG. 1.
Figure 3:
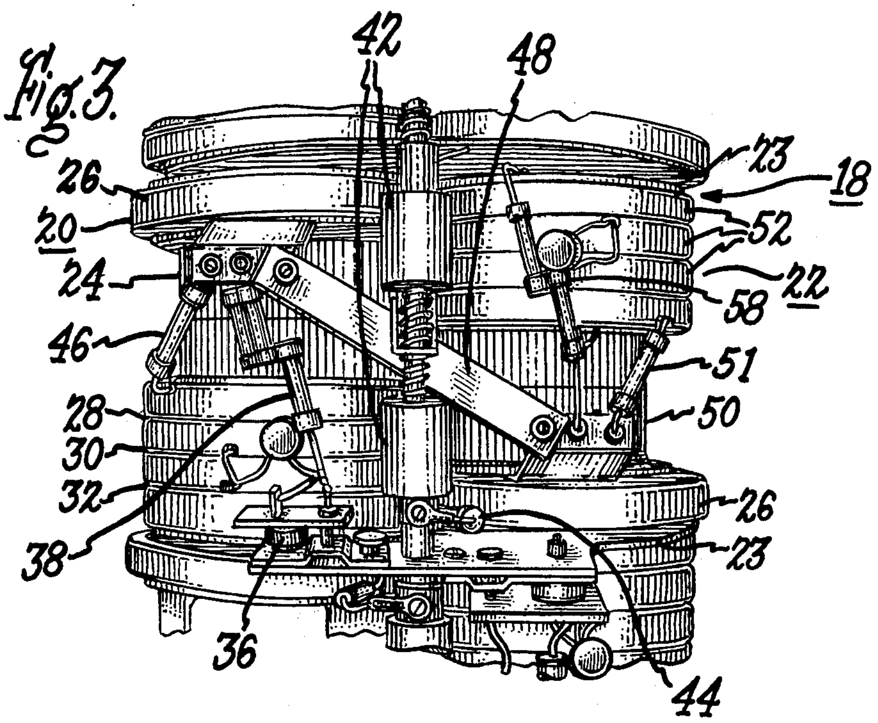
FIG. 3 is a side view of an arrester module assembly unit of the arrester of FIG. 1.
Figure 4:
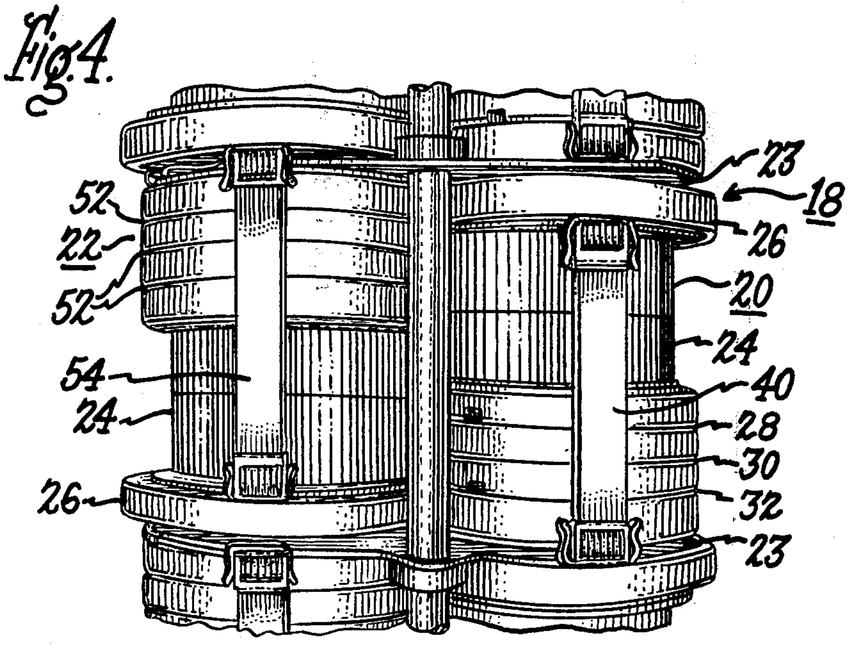
FIG. 4 is a view of the unit of FIG. 3 from the opposite side.

A module assembly unit 18 of the arrester 10 of the preferred embodiment is shown in a partly schematic diagram in FIG. 2 and from two opposite side views in FIGS. 3 and 4. The partly schematic view of FIG. 2 will permit a ready identification of the corresponding components in the FIGS. 3 and 4. Components are identified by the same reference numerals in all three of the FIGS. 2, 3 and 4.

Referring now to FIGS. 2, 3 and 4, the assembly unit 18 includes a first arrester module 20 and a second arrester module 22 pressed together longitudinally in a side-by-side relationship between two metal end plates 23.

The first module 20 has a pair of adjacent, disc-shaped valve elements, or blocks 24 with metallized faces and a collar of insulating glass about the periphery. One outer face of the blocks 24 is spaced from the upper end of plates 23 by a ceramic spacer 26. Pressing against the other outer one of the faces is a set of three preionized spark gap units 28, 30, 32 which are addressed by the trigger gap 34 of a triggering circuit 36 shown within the dashed rectangle. Voltage for the preionizer of the circuit 36 is supplied by the silicon carbide ionizer voltage supply 38. A major voltage grading resistor 40 is connected in parallel with both the valve blocks 24 and the gap units 28, 30, 32. Grading capacitors 42 in series with an upset resistor 44 are connected between the end plates 23. A bleeder resistor 46 having a substantially linear current-voltage characteristic and a resistance of about 300,000 ohms is connected in parallel with the valve blocks 24.

The second arrester module 22 beside the first module 20 is connected in series with the first module 20 by a metal strap 48. The second module 22 is in most respects similar to the first module 20, in that it includes valve blocks 50, a bleeder resistor 51, spark gap units 52, and a major grading resistor 54. These are all essentially identical in structure and arrangement to the corresponding components of the first module 20, but the second module 22 is in inverted position physically. However, the gap units 52 of the second module 22 function as cascade gaps, and hence there is no trigger gap with its associated circuitry, as for the first module 20. In the corresponding place of the ionizer power supply resistors 38 of the first module 20 there are, instead, some silicon carbide compensation grading resistors 58.

Each of the modules 20, 22 has a 6 kilovolt rating. The module assembly unit 18 thus has a rating of 12 kilovolts.

The valve blocks 24 of the arrester 10 are each a sintered ceramic disc of zinc oxide compound. The disc is pressed from a powder having the following composition, in mole percent:

| | | |
|---|---|---|
| 96.55% | $ZnO$ | (zinc oxide) |
| 0.5% | $Bi_2O_3$ | (bismuth trioxide) |
| 0.5% | $Co_2O_3$ | (cobalt trioxide) |
| 0.5% | $MnO_2$ | (manganese dioxide) |
| 1.0% | $Sb_2O_3$ | (antimony trioxide) |
| 0.5% | $Cr_2O_3$ | (chromic oxide) |
| 0.1% | $BaCO_3$ | (barium carbonate) |
| 0.1% | $B_2O_3$ | (boron oxide) |
| 0.25% | $SiO_2$ | (silicon dioxide) |

After the disc is pressed into shape, it is sintered in generally the same way as are the more commonly used silicon carbide discs. The metallized layers and the insulating anti-flashover collar are applied in later steps. After sintering, the disc is about 0.9 inches thick, about 2¾ inches in diameter, and has an exponent of about 40.

Figure 5:
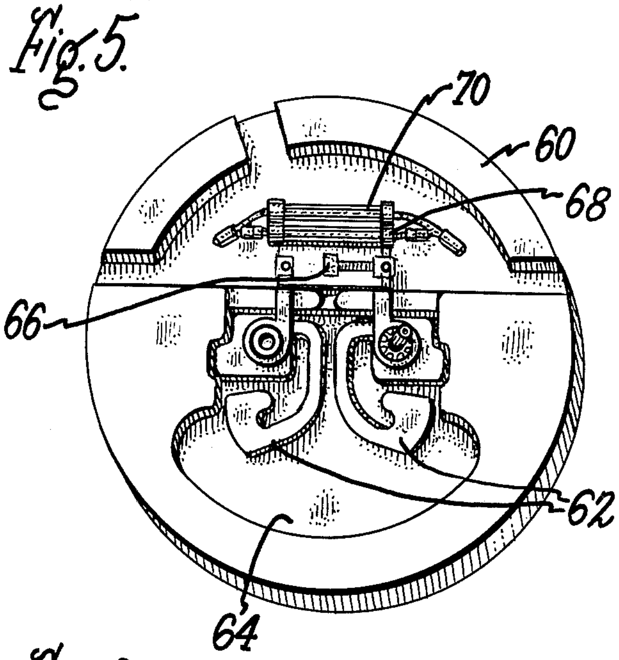
FIG. 5 is an elevated perspective view of an exposed portion of a gap unit of the module assembly unit of FIGS. 3 and 4.
Figure 6:
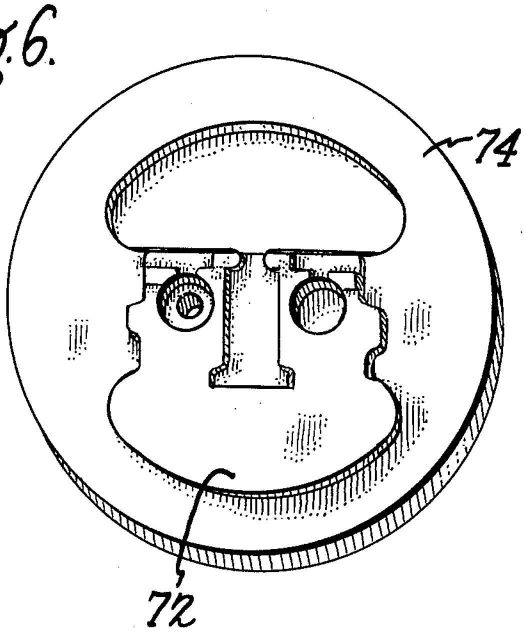
FIG. 6 is an elevated perspective view of a matching cover portion of the gap unit of FIG. 5.

The spark gap unit 32 is illustrated separately in more detail in FIGS. 5 and 6. FIG. 5 shows a ceramic support disc 60 in which is mounted a pair of horn gap electrodes 62 extending into a depression 64 which forms an arcing chamber. Attached across the electrodes 62 is a preionizer 66 which includes a resistor 68 and an upset capacitor 70. The matching portion of the chamber 64 is provided by a raised portion 72 in the opposite side of an adjacent support disc 74 as shown face up in the FIG. 6. Others of the gap units are similar to the unit 32, but may be lacking an upset capacitor.

It can be seen that the gap unit 32 has a capability of clearing only relatively low follow currents, on the order of several amperes, since typical current-limiting features such as magnetic coils or surface extensions in the end wall portion of the arcing chamber 24 are absent. Because the exponent of the valve blocks 24 is so high, however, the follow current is actually so low that such current-limiting features are unnecessary, and only a simple gap section such as is formed by the gaps 28, 30, 32 is adequate. The arrester 10 is particularly suited for high voltage direct current systems, but may also be used for alternating current systems.

GENERAL CONSIDERATIONS

The degraded multiple lightning surge performance of prior arresters with a high exponent valve section and a series gap section has been found to be attributable to charge retention by various potential points of the valve section. This can be better understood by considering the clearing function of the arrester module 20 of the arrester 10 of the preferred embodiment, since such a module is itself for this purpose a complete arrester operating on its proportionate share of the total arrester voltage for which the stack of assembly modules is designed. After a discharge and just prior to clearing of the follow current, substantially the entire voltage across the module 20 appears across the valve blocks 24. When the follow current is now suddenly terminated by a clearing of the gaps, the faces of the valve blocks 24 are left momentarily capacitively charged at different potentials corresponding to the recent voltage gradient along the valve blocks 24. Some current through the varistor material of the valve blocks 24 and also through the preionizer resistors of the gap units 28, 30, 32 will bring about the recovery of the faces to a common potential, in this instance the potential of the connecting strap 48, which is for the individual module analogous the line voltage of an arrester. This likewise brings about the recovery of the gap section to its normal operating voltage. It is apparent that voltages across the gap units 28, 30, 32 are affected by the voltages across the valve blocks 24. Thus, the voltage recovery of the gap units 28, 30, 32 is tied to the recovery of the valve blocks 24.

The delay in recovery of the gap section voltage has been found to be an advantage when the arrester is used for a direct current system. A simple gap unit which clears on alternating current has the benefit of repeated zero currents every half cycle which provide time for the arc gases to deionize sufficiently to prevent a restriking of the arc during the next voltage cycle and after voltage recovery of the gap section. In the case of a direct current, however, the voltage recovery of the gap section must not be so rapid that its recovery rate exceeds the rate of increased voltage withstand capability of the deionizing gases, or there will be a repeated restriking of the arc with eventual failure of the arrester. To provide reliable clearing of direct currents, the time constant should at least be several hundred microseconds. For an arrester whose gap units are not provided with special features to speed arc gas deionization, it is desirable that the valve section time constant be at least about 1 millisecond.

The time constant of the valve section must, on the other hand, not be so great that the arrester will be likely to be subjected to the second impulse of a multiple lightning surge before the voltage of the gap section has recovered sufficiently to provide accurate sparkover characteristics. To avoid such an occurrence, the time constant of the valve section should be no greater than about 10 milliseconds and is preferably more on the order of between 1 and 2 milliseconds, as for the arrester 10 of the preferred embodiment.

The desired time constant for the valve section can be achieved by various different approaches, depending upon the particular valve material and physical configuration. For the case of an arrester with disc-shaped high exponent zinc oxide compound material valve blocks, the capacitance of the valve section is naturally high, meaning that it is at least several hundred picofarads, due to the dielectric constant of the material and the physical configuration of the blocks. In addition, since the valve block material has a high exponent, the resistance at normal arrester voltage is rather high. Hence, the time constant is so large that it must be reduced to the desired value of between 1 and 2 milliseconds by provision of a parallel bleeder resistor. There may, however, be other high exponent materials which result in valve blocks of lower capacitance, either because of their dielectric constant or because the configuration of the valve blocks with such material is one of the lower capacitance, such as one with a greater distance between the conducting faces of the valve blocks. In such a case it may be desirable to add a capacitor in parallel with the valve section to bring the time constant up to about 1 millisecond.

It is conceivable even to add a capacitor in parallel to a low exponent valve section to bring the time constant up to the desired range. However, a low exponent valve section will generally have a rather low resistance at normal arrester voltage, and therefore will typically have a time constant of only several microseconds or less. Thus the parallel capacitor required to bring the time constant to the desired range would be so large as to make such an arrangement impractical. Given a particular valve block material and configuration in the valve section of a particular arrester, a person of ordinary skill in the art of voltage surge arresters can readily determine the choice of circuit elements and their values for adjusting the valve section time constant to the desired value.

The term "high" as used herein to describe the current-voltage characteristic exponent of a non-linear resistor, such as an arrester valve section, means an exponent greater than about 10. This is generally much higher than the exponent of, for example, the more commonly used silicon carbide material, which typically has an exponent of about four.

The expression "high exponent valve section" as used herein describes a valve section having valve blocks of high exponent non-linear resistance material, such as in the arrester of the preferred embodiment in which the valve section exhibits an exponent of from about 25 to about 50, the exponent varying with the voltage. It should be noted, however, that the expression also is appropriately intended to describe a valve section of many low exponent valve blocks in combination with shunting gap units which effectively raise the exponent of the valve section to a value greater than 10. Such a combination is described, for example in U.S. Pat. No. 3,320,482 issued May 16, 1967 to E. C. Sakshaug et al.

The expression "simple gap section" as used herein means a gap section which carries no more than about 20% of the arrester voltage, the total voltage across the arrester during a discharge. As a practical matter, this generally means that the gap units of the section are not provided with functionally significant active current-limiting features such as blow-out coils or arc chamber end wall teeth. For prior arresters with a current-limiting gap section, on the other hand, the gap section typically carries about half the total arrester voltage during discharge. This much higher proportion of discharge voltage for an arrester with a current-limiting gap section is attributable to the current-limiting function itself. A minimal functionally significant limiting of current by a gap section of an arrester generally results in at least about one fifth of the discharge voltage being carried by the gap section.

For an arrester in accordance with the present invention, however, it is desirable, but not necessarily essential, to avoid any current-limiting features in the gap section, and thus to decrease the proportion of arrester voltage carried by the gap section during a discharge to a low value of less than about one fifth. This is because limiting of current necessarily involves increasing the impedance of the gap section by increased arc resistance due to arc lengthening. Such increased impedance increases the total energy dissipation from the arcs to their ambient gas and associated electrical structures to raise temperatures. The raised temperatures then degrade the clearing and sparkover functions of the gap units in well known ways. For the arrester of the preferred embodiment, only about one twentieth of the arrester voltage is carried by the gap section, thus minimizing any undesirable heating. While the horn configuration of the electrodes does in fact encourage some outward movement of the arc with resulting elongation and increased impedance, the travel is provided to minimize local electrode erosion, and not for limiting current. With high exponent valve blocks the follow current is already sufficiently low to satisfy the clearing conditions otherwise sought by current-limiting features of gap assemblies.

The term "time constant" as used herein with regard to arrester valve section refers to the resistance-capacitance time constant of the valve section, that being the number of seconds required for the charge in the section to drop by 63.2% of its initial value at the instant of clearing of the current.

We claim:

1. An electrical overvoltage surge arrester, comprising a non-linear resistance valve section connected in series with an electrode gap section between two terminals, said valve section having a resistance-capacitance time constant of at least several hundred microseconds and less than about 10 milliseconds.

2. The arrester defined in claim 1 wherein said valve section has a relatively high capacitance of on the order of at least several hundred picofarads.

3. The arrester defined in claim 2 wherein said valve section has a relatively high current-voltage characteristic exponent.

4. The arrester defined in claim 3 wherein said exponent of said valve section is between about 25 and about 50.

5. The arrester defined in claim 4 and comprising at least one bleeder resistor connected in parallel with at least one valve element of said valve section.

6. The arrester defined in claim 5 wherein said gap section is a simple gap section and carries less than about 1/5 of the voltage across said arrester during a discharge.

7. The arrester defined in claim 6 wherein said exponent is between about 25 and about 50.

8. The arrester defined in claim 7 wherein the resistance of said bleeder resistor is chosen so that a period of about one to two milliseconds elapses between the clearing of follow current by said gap section and the return of the voltage across said gap section to substantially its normal operating value.

9. The arrester defined in claim 8 and wherein said gap section carries about 1/20 of the voltage across said arrester during a discharge.

* * * * *